United States Patent [19]

Tadema

[11] Patent Number: 4,878,426
[45] Date of Patent: Nov. 7, 1989

[54] REFINING DEVICE

[75] Inventor: Jan C. Tadema, Bergen, Netherlands

[73] Assignee: Wiener & Co. Apparatenbouw B.V., Netherlands

[21] Appl. No.: 200,974

[22] Filed: Jun. 1, 1988

[30] Foreign Application Priority Data

Jun. 12, 1987 [NL] Netherlands ................... 8701379

[51] Int. Cl.$^4$ ............................................. A23G 1/00
[52] U.S. Cl. ......................................... 99/485; 99/348;
99/460; 241/47; 241/101.2; 261/89; 261/DIG.
16; 366/303; 366/315
[58] Field of Search .................. 99/348, 485, 455, 483,
99/460, 461, 467, 471; 426/631, 520, 613, 249;
366/303, 305, 307, 304, 315, 317, 101–104;
241/101.2, 101.5, 47, 188 A, 243; 261/89, 84,
DIG. 16

[56] References Cited

U.S. PATENT DOCUMENTS

| 525,095 | 8/1894 | Detwiler | 366/104 |
|---|---|---|---|
| 2,355,539 | 8/1944 | Lawton | 366/315 |
| 2,677,942 | 5/1954 | Schott et al. | 99/455 |
| 2,838,246 | 6/1958 | Adorno et al. | 241/47 |
| 2,891,777 | 6/1959 | Gregorius | 366/303 |
| 3,307,792 | 3/1967 | Hughes et al. | 366/315 X |
| 3,420,456 | 1/1969 | Von Eiff et al. | 241/101.2 |
| 3,506,461 | 4/1970 | Noschinski et al. | 99/485 X |
| 3,955,489 | 5/1976 | Goerling et al. | 99/348 X |
| 4,267,703 | 5/1981 | Minifie et al. | 99/348 X |
| 4,397,794 | 8/1983 | Pilo | 261/89 X |
| 4,620,953 | 11/1986 | Silla et al. | 261/DIG. 16 |
| 4,628,803 | 12/1986 | Bonora et al. | 99/348 |
| 4,648,315 | 3/1987 | Blum | 99/455 |
| 4,706,558 | 11/1987 | Snyder, Jr. | 99/455 |

Primary Examiner—Timothy F. Simone
Attorney, Agent, or Firm—John P. Snyder

[57] ABSTRACT

Chocolate is refined by so-called conching. This is carried out in a device whereby the mass is spread out in a thin film and exposed to the air. Among other things, the viscosity is reduced as a result. By subjecting the chocolate mass directly prior to the spreading in a thin film to high shear stresses, a further reduction in viscosity takes place. The invention provides a device wherein, directly preceding the spreading out in a film, the mass is subjected to high shear stresses by means of arranging radially directed pins on a drive shaft.

8 Claims, 1 Drawing Sheet

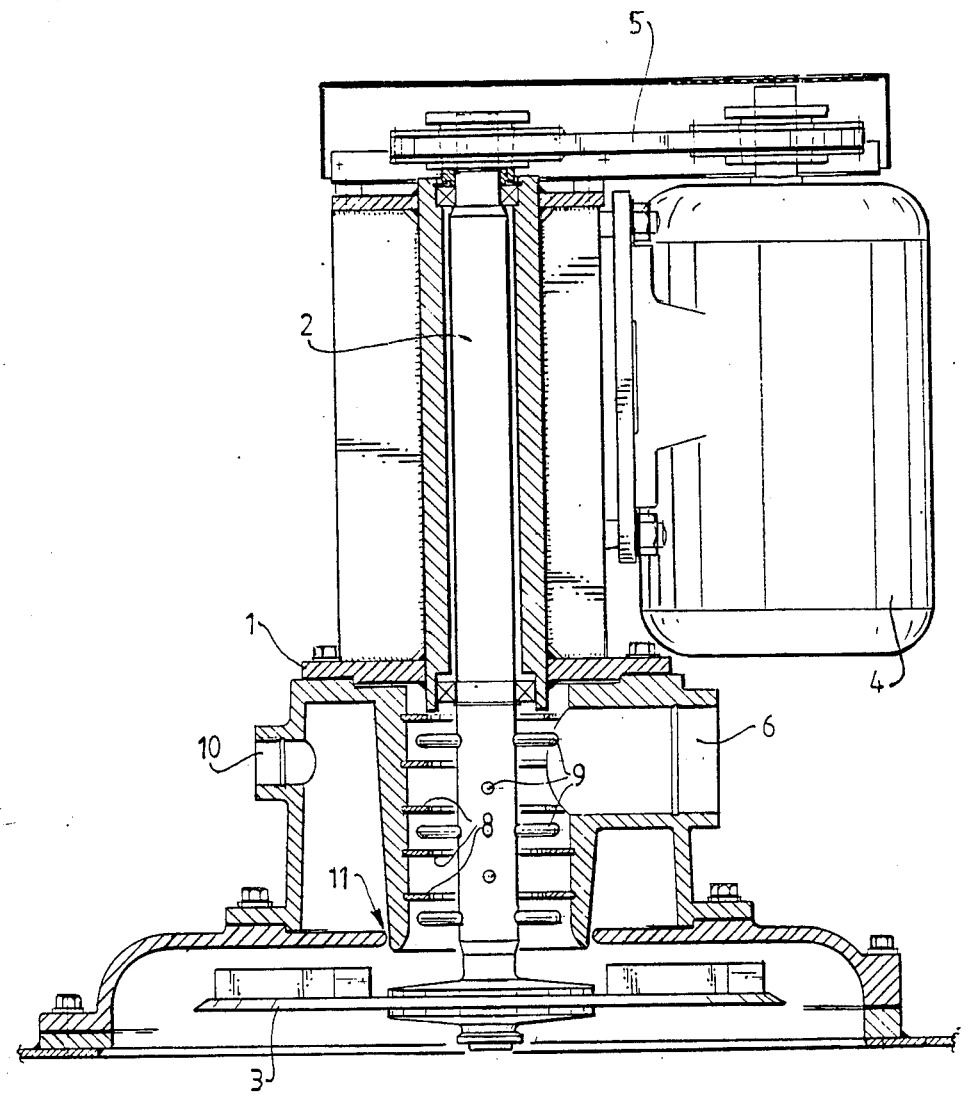

REFINING DEVICE

The invention relates to apparatus for refining a mass of chocolate as it is being manufactured, in which the apparatus includes means for spreading the chocolate mass into a film and means for supplying air to the thin film of chocolate mass so spread out.

Such a device is generally known and serves to improve the quality of a chocolate mass for processing. In the refining device the chocolate mass is spread out in a thin film and the film is exposed to air. As a result moisture and amino acid are taken from the chocolate mass, which results among other things in a lower viscosity. As a consequence, a lesser addition of fat to the mass is necessary.

The invention has for its object to further lower the viscosity of the chocolate mass and therefore improve the refining process.

This is achieved according to the invention with by subjecting the chocolate mass not only to shear forces as it is spread out into the film, but also to separate high shear forces.

Through the subjecting of the chocolate mass to high shear stresses a reduction in viscosity takes place prior to the reduction of the viscosity the mass undergoes during spreading out in a thin film, whereby shear forces likewise occur.

It is remarked that it is per se known to subject chocolate mass to relatively high shear stresses in a device intended for that purpose in order to lower the viscosity. The effect thereof is however limited since the process is partially reversible. During transport to the refining device an increase in viscosity therefore takes place. According to the current invention however, both treatments are integrated.

In the case of a device whereby the means for spreading consists of a rotary driven disc, the high shear forces may effectively be achieved by alternate radial pins and rings within a housing for the drive shaft of the ring upon which the chocolate mass is spread.

The invention is now elucidated with reference to a sectional view of a device according to the invention.

Mounted in housing 1 is a shaft 2 driven for rotation and bearing on the underside a disc 3. Shaft 2 is driven by a motor 4 and transmission 5 at a speed of approximately 2000 revolutions per minute. Chocolate mass is fed in via the inlet 6 and subjected to the space 7 that is concentric to the shaft 2 to high shear stresses as a result of the coaction of the stationary rings 8 and the pins 9 rotating with shaft 2. As a consequence of gravity the mass moves to the rotating disc 3 where the mass is spread out in a thin film and is thereby also subjected to shear stresses.

Air is introduced via the inlet 10 and supplied through the narrow annular gap 11 to the thin film of chocolate mass on disc 3. As a result of this aeration moisture and amino acid escape, leading to an improvement in the quality of the mass. The spreading into a thin film and aerating is a continuous process. After a time the mass moves off the disc 3 and is discharged from the device for further processing.

I claim:

1. In apparatus for refining chocolate, the combination of means for mechanically reducing the viscosity of a chocolate mass in a first stage and means for mechanically reducing the viscosity of the chocolate mass and forming a thin film of chocolate in a second stage, and means for supplying air to the thin film of chocolate during the second stage of viscosity reduction.

2. Apparatus for refining chocolate, comprising a housing having a vertically extending driven shaft journalled therein, the housing defining a vertical chamber surrounding the driven shaft and having means for feeding a chocolate mass into the upper end of the chamber, the chamber having a series of vertically spaced rings therein projecting inwardly toward the driven shaft, a series of radial pins carried by the driven shaft in interdigitated relation to the rings whereby the chocolate mass is subjected to viscosity-reducing high shear forces within the chamber, a disc connected to the lower end of the driven shaft and onto the central portion of which the chocolate mass is discharged for being radially spread into a thin film thereonto and discharged peripherally therefrom as secondarily viscosity-reduced chocolate, the housing including air supply means defining a narrow annular gap for introducing air generally centrally upon the thin film radially spreading upon the disc.

3. A device for refining a chocolate mass comprising first means for subjecting a chocolate mass to high shear stress, means for feeding a chocolate mass to said first means, and second means for receiving a chocolate mass from said first means, said second means spreading a chocolate mass into a thin film and subjecting the mass to further shear stress.

4. A device as defined in claim 3 wherein said first means includes a drive shaft, housing means supporting said drive shaft for rotation, radially inwardly directed rings supported by said housing means, and radially directed pin means carried by said drive shaft and interdigitated with said ring means.

5. A device as defined in claim 3 wherein said second means comprises a substantially horizontally disposed rotating disc means, and means for directing a chocolate mass from said first means onto the central portion of the disc means.

6. A device as defined in claim 5 wherein said housing includes means defining a downwardly facing annular gap disposed over an inner portion of said disc means, and means for introducing air downwardly through said gap to impinge upon the thin film of chocolate on said disc means.

7. A device as defined in claim 3 wherein said first means includes a drive shaft, housing means supporting said drive shaft for rotation, radially inwardly directed rings supported by said housing means, and radially directed pin means carried by said drive shaft and interdigitated with said ring means, said second means comprising a substantially horizontally disposed rotating disc means, and means for directing a chocolate mass from said first means onto the central portion of the disc means.

8. A device as defined in claim 4 wherein said housing includes means defining a downwardly facing annular gap disposed over an inner portion of said disc means, and means for introducing air downwardly through said gap to impinge upon the thin film of chocolate on said disc means.